(12) United States Patent
Droste et al.

(10) Patent No.: US 10,262,468 B2
(45) Date of Patent: Apr. 16, 2019

(54) VEHICLE ANTENNA PANE FOR A TOLL PAYMENT SYSTEM

(71) Applicant: SAINT-GOBAIN GLASS FRANCE, Courbevoie (FR)

(72) Inventors: Stefan Droste, Herzogenrath (DE); Volkmar Offermann, Eschweiler (DE); Stefan Garcia, Orgeval (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 15/740,341

(22) PCT Filed: Nov. 9, 2016

(86) PCT No.: PCT/EP2016/077072
§ 371 (c)(1),
(2) Date: Dec. 27, 2017

(87) PCT Pub. No.: WO2017/081052
PCT Pub. Date: May 18, 2017

(65) Prior Publication Data
US 2018/0240284 A1    Aug. 23, 2018

(30) Foreign Application Priority Data
Nov. 10, 2015   (EP) ..................................... 15193874

(51) Int. Cl.
*H01Q 1/12*     (2006.01)
*H01Q 1/32*     (2006.01)
(Continued)

(52) U.S. Cl.
CPC ...... *G07B 15/063* (2013.01); *B32B 17/10036* (2013.01); *B32B 17/10192* (2013.01);
(Continued)

(58) Field of Classification Search
CPC .................................. H04B 5/02; H04W 4/80
See application file for complete search history.

(56) References Cited

U.S. PATENT DOCUMENTS

| | | | | | |
|---|---|---|---|---|---|
| 2,613,295 | A | * | 10/1952 | Stone | ..................... B60J 7/0573 |
| | | | | | 200/85 R |
| 6,313,796 | B1 | | 11/2001 | Potin et al. | |

(Continued)

FOREIGN PATENT DOCUMENTS

| | | |
|---|---|---|
| DE | 102005055835 A1 | 5/2007 |
| DE | 202008017611 U1 | 4/2010 |

(Continued)

OTHER PUBLICATIONS

International Search Report for International Application No. PCT/EP2016/077072 filed Nov. 9, 2016 on behalf of Saint-Gobain Glass France. dated Dec. 13, 2016. 7 pages (German + English Translation).

(Continued)

*Primary Examiner* — Hsinchun Liao
(74) *Attorney, Agent, or Firm* — Steinfl + Bruno, LLP

(57) ABSTRACT

A vehicle antenna pane for operating a toll payment system using short-range radio signals is presented. The vehicle antenna pane includes a pane, a first set of receiver/transmitter for communication with a toll station, and a second set of receiver/transmitter for communication with a mobile device inside of the vehicle. Communication between the pane and the toll station is according to a radio frequency spectrum suitable for a longer range communication, and communication between the pane and the mobile device is according to a radio frequency spectrum suitable for a shorter range communication. The vehicle antenna pane also includes a signal converter used for converting signals between the different radio frequency spectra.

21 Claims, 3 Drawing Sheets

Figure 1A:
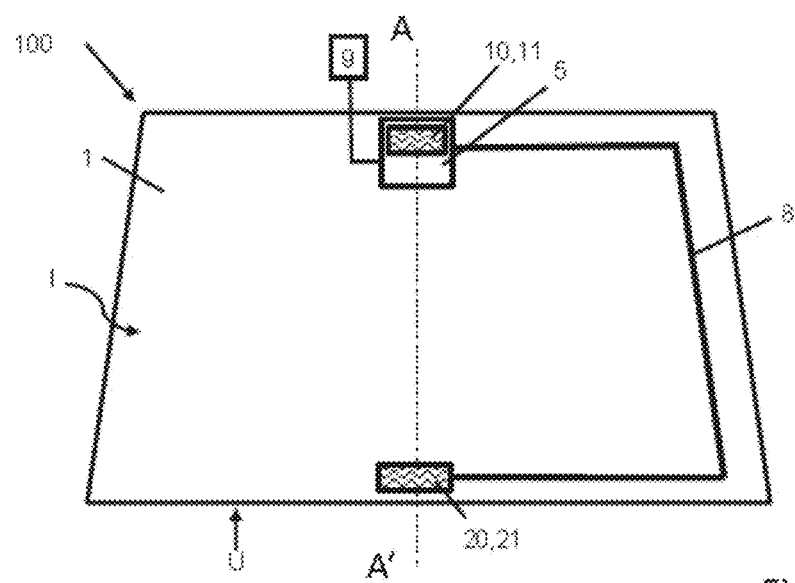

(51) Int. Cl.
*H04W 4/80* (2018.01)
*B32B 17/10* (2006.01)
*G07B 15/06* (2011.01)
*H04W 84/12* (2009.01)

(52) U.S. Cl.
CPC .. *B32B 17/10761* (2013.01); *B32B 17/10788* (2013.01); *H01Q 1/1271* (2013.01); *H04W 4/80* (2018.02); *B32B 2605/08* (2013.01); *H01Q 1/3208* (2013.01); *H04W 84/12* (2013.01)

(56) References Cited

U.S. PATENT DOCUMENTS

| | | |
|---|---|---|
| 2002/0045037 A1 | 4/2002 | Boire et al. |
| 2011/0136429 A1 | 6/2011 | Ames et al. |
| 2014/0316685 A1 | 10/2014 | Povolny et al. |

FOREIGN PATENT DOCUMENTS

| | | |
|---|---|---|
| EP | 0608180 A1 | 7/1994 |
| EP | 0847965 B1 | 10/2004 |
| EP | 2793205 A1 | 10/2014 |
| WO | 2011/086554 A1 | 7/2011 |
| WO | 2012/052315 A1 | 4/2012 |

OTHER PUBLICATIONS

Written Opinion for PCT Application No. PCT/EP2016/077072 filed Nov. 9, 2016 on behalf of Saint-Gobain Glass France. dated Dec. 13, 2016. 12 pages. (English translation + German original).

\* cited by examiner

VEHICLE ANTENNA PANE FOR A TOLL PAYMENT SYSTEM

The invention relates to a vehicle antenna pane, a toll payment system, and a method for operating a toll payment system.

CROSS REFERENCE TO RELATED APPLICATIONS

The present application is the U.S. National Stage of International Patent Application No. PCT/EP2016/077072 filed on Nov. 9, 2016, which, in turn, claims priority to European Patent Application No. 15193874.3 filed on Nov. 10, 2015.

Modern toll collection and toll payment systems are, as a rule, based on two principles: Toll collection, which detects the position of the vehicle permanently under global navigation satellite systems (GLASS) and calculates the toll on the distances traveled on specific routes. Alternative toll systems use control points with so-called "toll beacons", which make entry into a defined route area dependent on payment of the toll. The toll beacons use short-range radio signals, for example, according to the DSRC (Dedicated Short Range Communication) Standard, for communication with a mobile detection unit (On Board Unit, OBU). Such mobile detection units are known, for example, from DE 10 2005 055 835 A1.

The systems often have the disadvantage that they require a specific detection unit issued by the toll station operator and under certain circumstances, when multiple toll stations are passed, multiple detection units with different systems are necessary.

The object of the present invention consists in providing an improved vehicle antenna pane for operating a toll payment system that enables payment of the toll with multiple toll station systems in a simple manner.

The object of the present invention is accomplished according to the invention by a vehicle antenna pane in accordance with the independent claim 1. Preferred embodiments emerge from the subclaims. A further aspect of the invention comprises a toll payment system in which the electronic payment operation is performed via the the mobile communication device.

Mobile communication devices, such as smartphones or Internet-capable portable computers, are not suitable for communicating directly with a road toll system with an electronic payment system. The invention consists in providing a vehicle antenna pane that has a relay function and enables data exchange between the short-range radio communication of a road toll system and a mobile communication device. The vehicle antenna pane is independent of the actual toll station system. Only the software of the mobile communication device must be adapted to the respective toll station system. The actual payment operation can be done by direct billing with the toll station operator or in a simple manner through the mobile device billing.

The invention comprises a vehicle antenna pane system, referred to in the following, for short, as "vehicle antenna pane". The vehicle antenna pane according to the invention for a toll payment system includes at least the following features:
a pane,
a first receiver for receiving a first signal, which is transmitted by a toll station transmitter,
a signal converter for converting the first signal into a second signal and for converting a third signal into a fourth signal,
a second transmitter for transmitting the second signal to a mobile communication device,
a second receiver for receiving the third signal, which is transmitted by the mobile communication device,
a first transmitter for transmitting the fourth signal to a toll station receiver,
wherein the first and second receivers and the first and second transmitters are designed for receiving and transmitting short-range radio signals.

In an advantageous embodiment of a vehicle antenna pane according to the invention, the first receiver and the first transmitter are set up for receiving and transmitting first and fourth signals in the DSRC (Dedicated Short Range Communication) spectrum, preferably µwave DSRC per EN 12253 specified for 5.8 GHz or EN 302 571 specified for 5.9 GHz, or in the WLAN (Wireless Local Area Network) spectrum, preferably per IEEE-802.11 specified for 2.4 GHz, 5 GHz, or 60 GHz, particularly preferably per IEEE-802.11p.

The use of the DSRC spectrum is particularly advantageous, since such receivers and transmitters have a suitable range are already used in large numbers in existing toll systems.

In an advantageous embodiment of a vehicle antenna pane according to the invention, the second receiver and the second transmitter are set up for receiving and transmitting second and third signals in the NFC (Near Field Communication) spectrum, preferably per ISO/IEC 13157, ISO/IEC 16353, ISO/IEC 22536, or ISO/IEC 28361, in the WLAN (Wireless Local Area Network) spectrum, preferably per IEEE-802.11 specified for 2.4 GHz, 5 GHz, or 60 GHz, or in Bluetooth, preferably per IEEE 802.15.1.

The use of the NFC spectrum is particularly advantageous, since such receivers and transmitters have only a limited range of preferably less than 50 cm and are, consequently, particularly secure against tampering by third parties.

Of course, the signal converter according to the invention can also have two structurally separated signal converters: one for converting a first signal into a second signal and one for converting a third signal into a fourth signal.

In an advantageous embodiment, the first receiver and the first transmitter are arranged in a common structural unit and preferably have a same first antenna for receiving and transmitting. In an advantageous embodiment, the second receiver and the second transmitter are arranged in a common structural unit and preferably have a same second antenna for receiving and transmitting. In another advantageous embodiment, the first receiver, the first transmitter, the second receiver, and the second transmitter are arranged in a common structural unit.

In an advantageous embodiment of a vehicle antenna pane according to the invention, the pane is a composite pane for separating a vehicle interior from an external environment and comprises at least:
an inner pane with an outside surface (III) and an inside surface (IV),
an outer pane with an outside surface (I) and an inside surface (II),
and at least one intermediate layer, which bonds the inside surface (II) of the outer pane areally to the outside surface (Ill) of the inner pane.

The vehicle antenna pane according to the invention is suitable for separating a vehicle interior from an external environment. Thus, the inside surfaces (II,IV) of the vehicle antenna pane, which face the vehicle interior, as well as the outside surfaces (I,III), which face away from the vehicle interior, are defined.

Basically, all electrically insulating substrates that are thermally and chemically stable as well as dimensionally stable under the conditions of production and use of the vehicle antenna pane are suitable as (individual) pane, inner pane, and outer pane.

The (individual) pane, the inner pane, and/or the outer pane preferably contain glass, particularly preferably flat glass, float glass, quartz glass, borosilicate glass, soda lime glass, or clear plastics, preferably rigid clear plastics, in particular polyethylene, polypropylene, polycarbonate, polymethylmethacrylate, polystyrene, polyamide, polyester, polyvinyl chloride, and/or mixtures thereof. The (individual) pane, the inner pane, and/or the outer pane are preferably transparent, in particular for the use of the vehicle antenna pane as a windshield or rear window of a vehicle or other uses in which high light transmittance is desirable. In the context of the invention, "transparent" means a pane that has transmittance in the visual spectral range of more than 70%. For vehicle antenna panes that are not situated within the traffic-relevant field of view of the driver, for example, for roof panels, the transmittance can, however, be much lower, for example, greater than or equal to 5%.

The thickness of the (individual) pane, the inner pane, and/or the outer pane can vary widely and thus be ideally adapted to the requirements of the individual case. Preferably, standard thicknesses of 1.0 mm to 25 mm are used, preferably from 1.4 mm to 2.5 mm for vehicle glass. The size of the (individual) pane, the inner pane, and/or the outer pane can vary widely and is governed by the size of the application according to the invention. The (individual) pane, the inner pane, and/or the outer pane have, for example, in the automotive sector, customary areas from 200 $cm^2$ up to 3 $m^2$.

The pane can have any three-dimensional shape. Preferably, the three-dimensional shape has no shadow zones, such that it can, for example, be coated by cathodic sputtering. Preferably, the (individual) pane or the inner pane and the outer pane are flat or slightly or greatly bent in one or a plurality of spatial directions. In particular, flat panes are used. The panes can be colorless or colored.

The inner pane and/or the outer pane are bonded to one another by at least one intermediate layer. The intermediate layer is preferably transparent. The intermediate layer preferably includes at least one plastic, preferably polyvinyl butyral (PVB), ethylene vinyl acetate (EVA), and/or polyethylene terephthalate (PET). However, the intermediate layer can also include, for example, polyurethane (PU), polypropylene (PP), polyacrylate, polyethylene (PE), polycarbonate (PC), polymethylmethacrylate, polyvinyl chloride, polyacetate resin, casting resins, acrylates, fluorinated ethylene propylene, polyvinyl fluoride, and/or ethylene tetrafluoroethylene, or copolymers or mixtures thereof. The intermediate layer can be formed by one or even a plurality of films arranged one over the other or next to each other, with the thickness of a film preferably being from 0.025 mm to 1 mm, typically 0.38 mm or 0.76 mm. The intermediate layers can preferably be thermoplastic and, after lamination, bond the inner pane and the outer pane and any other intermediate layers to one another.

The lamination, i.e., the bonding of the inner pane and the outer pane via the intermediate layer is preferably done under the action of heat, vacuum, and/or pressure. Methods known per se can be used for producing a composite pane, for example, so-called autoclave methods, vacuum bag or vacuum ring methods, calender methods or vacuum laminators.

In an advantageous embodiment of a vehicle antenna pane according to the invention, the first receiver is set up such that a first signal that arrives on the outside surface (I) of the pane from the outside can be received; the first transmitter is set up such that a fourth signal can be transmitted by the pane to the outside; the second receiver is set up such that a third signal that arrives from the inside on the inside surface (I) of the pane can be received; and the second transmitter is set up such that a second signal can be transmitted by the pane to the inside. Here, "to the inside" means into the vehicle interior, in other words, by the pane in the direction of the surface normal of the inside surface (IV). Here, "to the outside" means into the surroundings of the vehicle and, in particular, by the pane in the direction of the surface normal of the outside surface (I) of the pane. Thus, it is possible to effect communication between a transmitter and receiver unit in the surroundings, such as a toll station transmitter and receiver, and a transmitter and receiver unit in the vehicle interior, such as a mobile communication device.

In an advantageous embodiment of a vehicle antenna pane according to the invention, the first receiver, the first transmitter, the second receiver, and the second transmitter are arranged on the inside surface (IV) of the pane.

In an alternative advantageous embodiment of a vehicle antenna pane according to the invention, the first receiver, the first transmitter, the second receiver, and the second transmitter are arranged between the inner pane and the outer pane of the pane. This is particularly advantageous since, thus, the first receiver, the first transmitter, the second receiver, and the second transmitter are particularly well protected against external influences such as moisture, damage, and tampering.

In an alternative advantageous embodiment of a vehicle antenna pane according to the invention, the first receiver and the first transmitter are arranged between the inner pane and the outer pane of the pane, and the second receiver and the second transmitter are arranged on the inside surface (IV) of the pane.

In an advantageous embodiment of a vehicle antenna pane according to the invention, the signal converter is arranged on the inside surface (IV) of the pane. In an alternative advantageous embodiment of a vehicle antenna pane according to the invention, the signal converter is arranged between the inner pane and the outer pane. This is particularly advantageous, since, thus, the signal converter it is particularly well protected against external influences such as moisture, damage, and tampering.

In an advantageous embodiment of a vehicle antenna pane according to the invention, the pane is a windshield of a vehicle. In an advantageous improvement, the second receiver and the second transmitter are arranged in the region of the lower edge of the pane. Preferably, the distance between the second receiver and/or the second transmitter and the lower edge of the pane is less than or equal to 30 cm. This is particularly advantageous with use of an NFC signal for the communication between the mobile communication device and a second receiver or a second transmitter, since an NFC signal has only a limited range and the mobile communication device can be arranged in a simple manner on the dashboard. Thus, the mobile communication device is within range of the second receiver and of the second transmitter and, at the same time, is conveniently reachable for the vehicle driver or the vehicle occupants.

In an advantageous embodiment, the vehicle antenna pane according to the invention has an enable switch. The enable switch can be a switch or button, preferably a capacitive touch sensor. The enable switch is preferably connected to the electronics of the signal converter such that the switching state of the enable switch can be transmitted to the mobile communication device via the second signal.

In a preferred exemplary embodiment, the enable switch is arranged on or in the pane according to the invention.

In an alternative preferred exemplary embodiment, the enable switch is arranged outside the pane and, for example, on or in the dashboard.

In another alternative preferred embodiment, the enable switch is at least a key or at least a section of a touch-sensitive display of the mobile communication device. This is particularly advantageous since, for this, no further technical equipment is required and also no separate signal has to be transmitted to the mobile communication device since the switching state of the enable switch can be determined and evaluated directly in the mobile communication device.

As already mentioned, the first receiver, the first transmitter, the second receiver, the second transmitter, the signal conductor, and/or the enable switch can be arranged inside the pane in the case of a composite pane. If the pane consists of an inner pane, at least one intermediate layer, and an outer pane, the first receiver, the first transmitter, the second receiver, the second transmitter, the signal conductor, and/or the enable switch can be arranged and laminated in either between the inner pane and the intermediate layer, between the intermediate layer and the outer pane, or between two or more intermediate layers.

The first and second transmitters and receivers according to the invention can include passive and active electrical components or consist of simple antenna structures.

In an advantageous embodiment of the invention, the first receiver, the first transmitter, the second receiver, the second transmitter, the signal lines, and/or the enable switch include a printed and fired electrically conductive paste, preferably a silver-containing screen printing paste. Of course, the first receiver, the first transmitter, the second receiver, the second transmitter, the signal line, and/or the enable switch can also be made of the printed and fired electrically conductive paste. The printed and fired electrically conductive paste advantageously has a thickness of 3 μm to 20 μm and a sheet resistance of 0.001 ohm/square to 0.03 ohm/square, preferably of 0.002 ohm/square to 0.018 ohm/square. Such electrically conductive structures are easy to integrate into the industrial production process and economical to produce.

In another advantageous embodiment of the invention, the first receiver, the first transmitter, the second receiver, the second transmitter, the signal conductor, and/or the enable switch include or are made of an electrically conductive foil, preferably a metal foil and in particular copper, silver, gold, or aluminum foil. Of course, such foils can also be arranged on carrier films, for example, polymeric carrier films such as polyimide or polyethylene terephthalate (PET). Such first receivers, first transmitters, second receivers, second transmitters, the signal conductors, and/or enable switches on carrier films are particularly advantageous since they can be produced from a single unit and, during production, can be conveniently and precisely placed in the subsequent vehicle antenna pane.

In another advantageous embodiment of the invention, the first receiver, the first transmitter, the second receiver, the second transmitter, the signal conductors, and/or the enable switch includes an electrically conductive structure that is electrically isolated from an electrically conductive layer by a coating-free separation region, in particular a coating-free separation line. Of course, the first receiver, the first transmitter, the second receiver, the second transmitter, the signal conductors, and/or the enable switch can also be made of an electrically conductive layer provided with such a separation region.

Such first receivers, first transmitters, second receivers, second transmitters, signal conductors, and/or enable switches are particularly advantageous if electrically conductive layers are already arranged in the pane, as is customary, for example, in the case of electrically heatable panes and panes with an integrated filter for solar radiation.

In an advantageous embodiment of the vehicle antenna pane according to the invention, the width of the separation lines is from 30 μm to 200 μm and preferably from 70 μm to 140 μm. Such thin separation lines permit reliable and adequately high electrical isolation and, at the same time, interfere with the view through the vehicle antenna pane only slightly or not at all.

Electrically conductive layers according to the invention are known, for example, from DE 20 2008 017 611 U1, EP 0 847 965 B1, or WO2012/052315 A1. They typically contain one, or a plurality of, for example, two, three, or four electrically conductive functional layers. The functional layers preferably contain at least one metal, for example, silver, gold, copper, nickel, and/or chromium, or a metal alloy. The functional layers can be made of the metal or the metal alloy. The functional layers particularly preferably contain silver or a silver-containing alloy. Such functional layers have particularly advantageous electrical conductivity with, at the same time, high transmittance in the visible spectral range. The thickness of a functional layer is preferably from 5 nm to 50 nm, particularly preferably from 8 nm to 25 nm. In this range for the thickness of the functional layer, advantageously high transmittance in the visible spectral range and particularly advantageous electrical conductivity are obtained. Typically, at least one dielectric layer is arranged in each case between two adjacent functional layers. This layer structure, is, in general, obtained by a sequence of deposition operations that are performed by a vacuum method such as magnetic field enhanced cathodic sputtering.

Other suitable electrically conductive layers preferably include indium tin oxide (ITO), fluorine-doped tin oxide ($SnO_2$:F), or aluminum-doped zinc oxide (ZnO:Al).

The electrically conductive layer can, in principle, be any coating that can be electrically contacted. If the pane according to the invention is intended to enable through-vision, as is the case, for example, with panes in the window region, the electrically conductive layer is preferably transparent. In an advantageous embodiment, the electrically conductive layer is a layer or a layer structure of a plurality of individual layers with a total thickness less than or equal to 2 μm, particularly preferably less than or equal to 1 μm.

An advantageous transparent electrically conductive layer according to the invention has a sheet resistance of 0.4 ohm/square to 200 ohm/square. In a particularly preferred embodiment, the electrically conductive layer according to the invention has a sheet resistance of 0.5 ohm/square to 20 ohm/square. Coatings with such sheet resistances are particularly suited for heating vehicle windows with typical on-board voltages of 12 V to 48 V or in the case of electric vehicles with typical on-board voltages of up to 500 V. However, such electrically conductive layers can be used even without electrical circuitry, and, for example, due to their infrared absorbing or reflecting properties.

Another aspect of the invention is a toll payment system, that at least comprises:
- a vehicle antenna pane according to the invention,
- a toll station transmitter, which transmits a first signal to the first receiver of the vehicle antenna pane,
- a toll station receiver, which receives a fourth signal transmitted by the first transmitter of the vehicle antenna pane, and
- a mobile communication device, which receives a second signal transmitted by the second transmitter of the vehicle antenna pane and transmits a third signal to the second receiver of the vehicle antenna pane.

wherein the mobile communication device transmits a "paid" signal to the second receiver as a third signal, when a payment operation has been performed, in other words, enabled.

Toll station receivers and toll station transmitters are, for example, components of a toll system and form a toll beacon.

In an advantageous embodiment of the toll payment systems according to the invention, an enable switch is electrically conductingly connected to the signal converter. Upon actuation of the enable switch, an "enable" signal is transmitted as a second signal by the second transmitter.

Another aspect of the invention is a method for operating a toll payment system, wherein:
a) a first signal is transmitted by a toll station transmitter,
b) the first signal is received by a first receiver of a vehicle antenna pane and is routed to a signal converter,
c) the first signal is converted by the signal converter into a second signal and is routed to a second transmitter,
d) the second signal is transmitted by the second transmitter and is received by a mobile communication device,
e) a payment operation is performed by a data processing program in the mobile communication device and upon successful completion of the payment operation, a "paid" signal is transmitted as a third signal by the mobile communication device,
f) the third signal is received by a second receiver and is forwarded to the signal converter,
g) the third signal is converted by the signal converter into a fourth signal and is forwarded to a first transmitter,
h) the fourth signal is transmitted by the first transmitter, and
i) the fourth signal is received by a toll station receiver.

In an advantageous embodiment of the method according to the invention, it is checked in a further step j) whether the fourth signal is a "paid" signal, and only if the fourth signal is a "paid" signal is passage through the toll station enabled.

In an advantageous embodiment of the method according to the invention, in step e) it is checked whether, within a time period t less than or equal to 300 s, preferably less than or equal to 30 s before receipt of the second signal, an enable switch was actuated, and only if the enable switch was actuated is a payment operation performed.

Another aspect of the invention includes a data processing program on the mobile communication device, with which the settling of the payment operation is performed in a toll payment system. The data processing program is installed on the mobile communication device and is executed there.

First, the second signal received on the mobile communication device is evaluated. If the second signal is an identification code of a toll station system known to the data processing program, a payment operation is processed. The payment process can, for example, be done through the invoicing of the mobile radio fee (prepaid or postpaid).

If the payment operation was successfully completed, a third signal with a "paid" code, which can be received by the second receiver, is transmitted by the mobile communication device.

If the payment operation is not successfully completed, either no third signal is transmitted or a third signal with a "not paid" code is transmitted.

In an advantageous improvement of the data processing program according to the invention, with the third signal, the mobile communication device transmits an identification code to the second receiver, which makes the mobile communication device (and thus the user of the vehicle) identifiable to the toll station system.

In another advantageous improvement of the data processing program according to the invention, before or during the payment operation, it is checked whether an enable switch was actuated. This can be done through an "enable" code of the second signal, for example, if the enable switch is electrically conductingly connected to the signal converter. Alternatively, the enable can be done by query of the keys or the display of the mobile communication device, with this information being queried by the data processing program. In this case, the keys or the display of the mobile communication device are the enable switch. This improvement of the data processing program according to the invention has the particular advantage that the payment operation is, additionally, validated by the actuation of the enable switch, and the payment operation is thus secured against abuse and tampering.

This is, in particular, the case when the payment operation is triggered only if the actuation of the enable switch is temporally associated with the arrival of a signal from the toll station transmitter. Thus, the enable switch can be actuated, for example, at the beginning of the trip and thus be enabled for payment at all anticipated toll stations.

Alternatively, the enable switch can be actuated shortly before entry of the vehicle into the transmission region of the toll station transmitter, for example, within a period less than or equal to 300 s, preferably less than or equal to 30 s before receipt of the second signal in the mobile communication device. This has the particular advantage that the payment operation is additionally protected against abuse and tampering.

In another alternative, after receipt of a second signal by the mobile communication device, the operator is prompted to actuate the enable switch and to validate the payment operation. This likewise has the particular advantage that the payment operation is additionally protected against abuse and tampering.

Of course, the vehicle antenna pane according to the invention described here or the toll payment system according to the invention described here can have receivers and transmitters, for example, for a GNSS (global navigation satellite system) based toll payment system.

Another aspect of the invention includes the use of the vehicle antenna pane according to the invention in means of transportation for travel on land or on water, in particular in trains, watercraft, and motor vehicles, for example, as a windshield, rear window, side window, and/or roof panel.

In the following, the invention is explained in detail with reference to drawings and exemplary embodiments. The drawings are schematic representations and not true to scale. The drawings in no way restrict the invention.

Figure 1B:
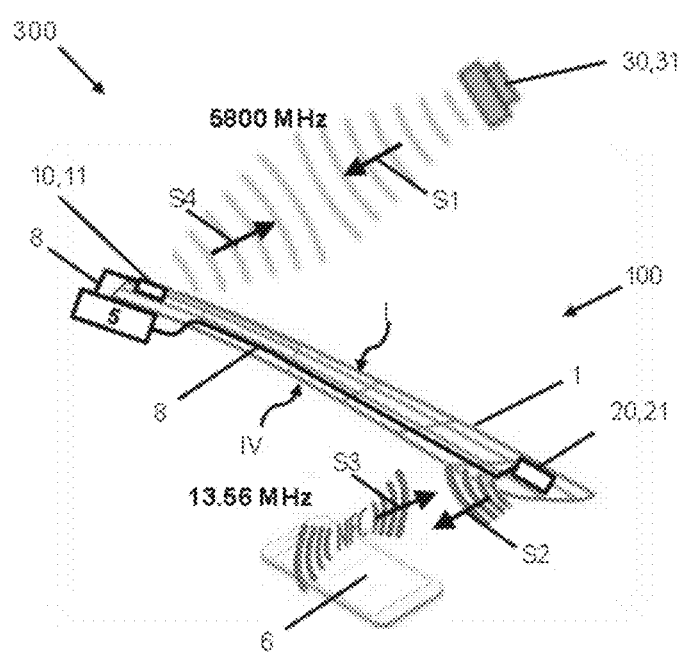
Figure 2A:
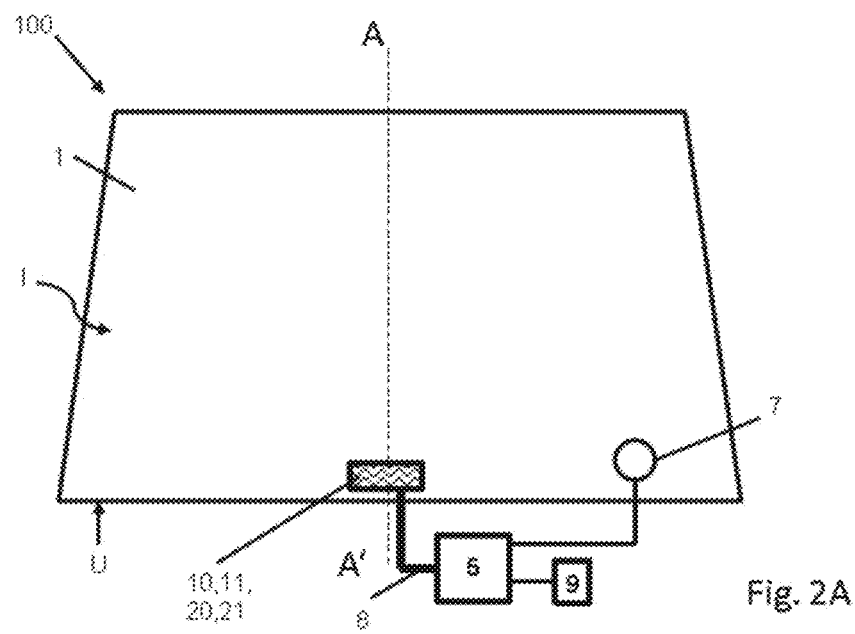
Figure 2B:
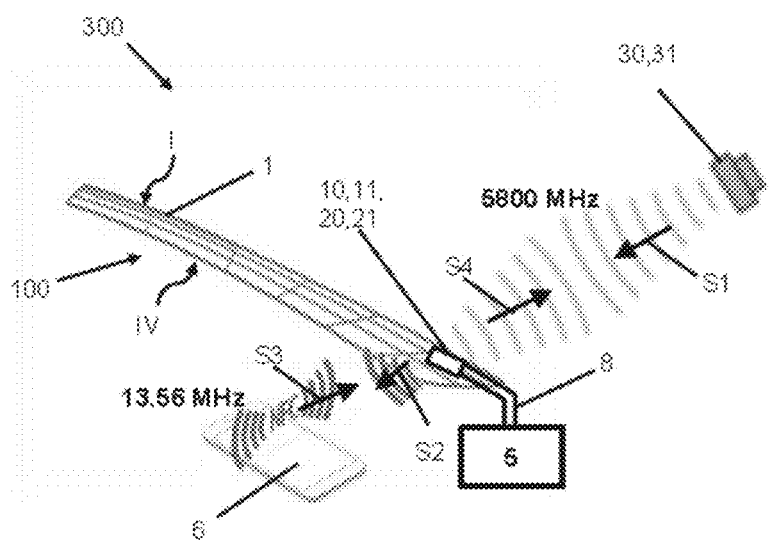
Figure 3:
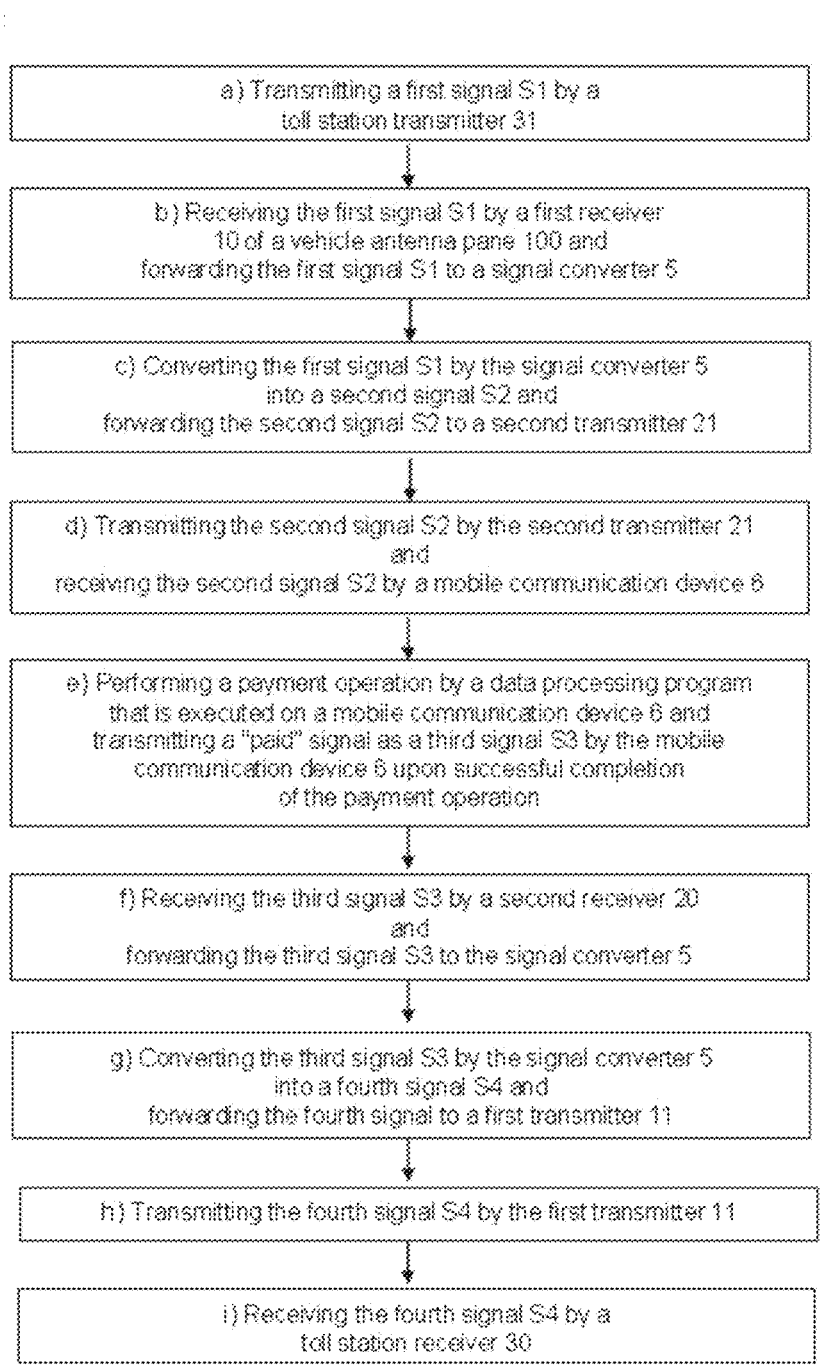

They depict:

FIG. 1A a plan view of an embodiment of a vehicle antenna pane according to the invention, FIG. 1B a cross-sectional view along the section line A-A' of FIG. 1A, FIG. 2A a plan view of an alternative embodiment of a vehicle antenna pane according to the invention, FIG. 2B a cross-sectional view along the section line A-A' of FIG. 2B, and FIG. 3 a detailed flowchart of an embodiment of the method according to the invention for operating a toll payment system according to the invention.

FIG. 1A depicts a plan view of an exemplary embodiment of a vehicle antenna pane 100 according to the invention. FIG. 1B depicts a cross-sectional view along the section line A-A' of the vehicle antenna pane 100 according to the invention of FIG. 1A. The vehicle antenna pane 100 comprises, here, for example, a pane 1, which is implemented as a composite pane made up of an inner pane and an outer pane, wherein the inner pane and the outer pane are bonded to one another via an intermediate layer. The vehicle antenna pane 100 is, for example, the windshield of a passenger car. The dimensions of the vehicle antenna pane 100 are, for example, 0.9 m×1.5 m.

The plan view in FIG. 1A is directed toward the outside surface (I) of the pane 1, in other words, toward the outside surface (I) of the outer pane, viewed from outside the vehicle. The inner pane and the outer pane are made, for example, of soda lime glass. The thickness of the inner pane is, for example, 1.6 mm and the thickness of the outer pane is 2.1 mm. Of course, the inner pane and the outer pane can also be implemented with the same thickness. The intermediate layer is a thermoplastic intermediate layer and is made, for example, of polyvinyl butyral (PVB) with a thickness of 0.76 mm.

FIG. 1B additionally depicts a toll payment system 300, which includes the vehicle antenna pane 100 according to the invention. The toll payment system 300 also includes a toll station receiver 30 and a toll station transmitter 31. Of course, the toll station receiver 30 and the toll station transmitter 31 can also be implemented in a device with a shared transmit and receive antenna. The toll station receiver 30 and the toll station transmitter 31 are, for example, installed on a toll beacon above a road, with the reception and transmission characteristic of the toll station receiver 30 and the toll station transmitter 31 aimed such that radio communication is possible with vehicles on the road. The toll station transmitter 31 is set up to transmit the first signal S1. The first signal S1 contains, for example, the code of a toll station. The toll station receiver 30 is set up to receive the fourth signal S4. The toll station receiver 30 and the toll station transmitter 31 are parts of a toll collection system and are coupled to a suitable data processing system and a passage control system, for example, a gate (not shown here).

The vehicle antenna pane 100 has, in an upper region, a first receiver 10 and a first transmitter 11. In this example, the first receiver 10 and the first transmitter 11 are implemented as a device with a shared antenna. The first receiver 10 is set up to receive a first signal S1 from a toll station transmitter 31; the first transmitter 11 is set up to transmit a fourth signal S4 to a toll station transmitter 31. The first signal S1 and the fourth signal S4 are short-range radio signals and, in this example, a DSRC signal, for example, in accordance with the μwave standard per EN 12253 with a carrier frequency of 5.8 GHz.

The vehicle antenna pane 100 has, in a lower region, a second receiver 20 and a second transmitter 21. In this example, the second receiver 20 and the second transmitter 21 are implemented as a device with a shared antenna. The first receiver 20 is set up to receive a third signal S3 from a mobile communication device 6; the second transmitter 21 is set up to transmit a second signal S2 to a mobile communication device 6. The second signal S2 and the third signal S3 are short-range radio signals and are, in this example, an NFC signal, for example, with a carrier frequency of 13.56 MHz. The second receiver 20 and the second transmitter 21 are, for example, arranged with a maximum distance of 25 cm from the lower edge U of the vehicle antenna pane 100. This has the advantage that the mobile communication device 6 can, in a simple manner, be arranged in or on the dashboard of the vehicle and thus be situated within the only limited range of the NFC signal.

In this example, the mobile communication device 6 has a transmit and receive unit for an NFC signal. Of course, the mobile communication device 6 can also communicate with the vehicle antenna pane 100 via other frequency ranges and transmission standards, for example, via WLAN or Bluetooth. Communication via NFC is particularly advantageous, since due to the short range of the NFC signal, tampering with the communication between the mobile communication device 6 and the vehicle antenna pane 100 can be largely ruled out and, thus, the payment operation can be performed securely and protected against abuse.

The first receiver 10, the first transmitter 11, the second receiver 20, and the second transmitter 21 are electrically conductingly connected via one or a plurality of signal conductors 8 to a signal converter 5. The signal converter 5 is electrically conductingly connected to a power supply 9. The signal converter 5 converts the first signal S1 (here, a DSRC signal with a frequency of 5.8 GHz) into a second signal S2 (here, an NFC signal with a frequency of 13.56 MHz). In addition, the signal converter 5 converts a third signal S3 (here, an NFC signal with a frequency of 13.56 MHz) into a fourth signal S4 (here, a DSRC signal with a frequency of 5.8 GHz). The signal converter 5 thus enables communication between the toll station system of the toll station operator and the mobile communication device 6 of the vehicle user.

In the example presented according to FIGS. 1A and 1B, the first receiver 10, the first transmitter 11, the second receiver 20, and the second transmitter 21 are in each case laminated into the interior of the pane 1, in other words, arranged between the inner pane and the outer pane. The signal converter 5 is, for example, arranged on the inside surface (IV) of the pane 1 and, for example, concealed by a camera cover, a cover of a communication window, or a rearview mirror. The signal conductors 8, which electrically conductingly connect the receivers 10,20 to the transmitters 11,21, are, for example, microstrip conductors made in each case of two copper flat conductors. Of course, the first receiver 10, the first transmitter 11, the second receiver 20, and/or the second transmitter 21 can also be arranged on the inside surface (IV) of the pane 1. The signal converter 5 can, with a suitable flat design, also be laminated within the pane 1.

FIG. 2A depicts a plan view of an alternative embodiment of a vehicle antenna pane 100 according to the invention: and FIG. 2B, a cross-sectional view along the section line A-A' of FIG. 2A. FIGS. 2A and 2B correspond substantially in form and material to FIGS. 1A and 1B such that, in the following, only the differences are dealt with.

In the exemplary embodiment shown here, the first receiver 10, the first transmitter 11, the second receiver 20, and the second transmitter 21 as well as the signal converter 5 are all arranged together in one assembly in the lower region of the pane 1 on the inside surface IV of the pane 1.

This has the particular advantage that the signal conductors 8, the receivers 10,20, transmitters 11,21, and signal converter 5 are connected to one another, can be kept short, or can even be omitted.

Moreover, the pane 1 has an enable switch 7. In this example, the enable switch 7 is a capacitive touch sensor that is integrated into the pane 1. The capacitive touch sensor includes, for example, a conductor loop that is inserted, glued, or printed between the inner pane and the outer pane or on the inside surface I of the pane 1. The capacitive touch sensor can also be a region of an electrically conductive coating of the pane 1 that has been electrically isolated, for example, by laser ablation from the surrounding electrically conductive coating. The enable switch 7 is electrically conductively connected to the signal converter 5. The electronics of the signal converter 5 are implemented in this example such that a switching signal of the enable switch 7 is converted into a second signal S2, for example, with an "enable" code and is transmitted to the mobile communication device 6. In the mobile communication device 6, a payment operation can be triggered or not based on information as to whether the enable switch 7 has been switched on or not (in other words, by the input of the "enable" code).

FIG. 3 depicts a flowchart of an embodiment of the method according to the invention for operating a toll system 300 according to the invention.

In a step a), a first signal S1 is transmitted by the toll station transmitter 31 of a toll beacon. Typically, toll station transmitters 31 transmit periodic signals, so-called "beacons", that notify suitable receivers of the presence of the transmitter. The first signal S1 can, for example, include a code with which the toll station can be unambiguously identified.

In a step b), the first signal S1 is received by the first receiver 10 of the vehicle antenna pane 100 and routed to a signal converter 5, for example, via a signal conductor 8. Thus, if a vehicle with a vehicle antenna pane 100 according to the invention enters the transmission region of the toll station transmitter 31, the first receiver 10 can receive the first signal S1 transmitted by the toll station transmitter 31. The first signal S1 is then fed via a signal conductor 8 to the signal converter 5.

In a step c), the first signal S1 is converted by the signal converter 5 into a second signal S2 and routed to a second transmitter 21. Communication is possible between the toll station and the mobile communication device 6 as to whether different frequency range, communication standards, and ranges of the radio signals are combined with one another. The second signal S2 includes, for example, the code of the first signal S1 but uses a different carrier frequency.

In a step d), the second signal S2 is transmitted by the second transmitter 21 and received by a mobile communication device 6, for example, a smartphone. The mobile communication device 6 has a suitable receiving unit for the frequency range and the communication standard of the second signal S2 and, for example, via an NEC interface. Furthermore, the mobile communication device 6 has a suitable data processing program, for example, in the form of a software application ("app", for short).

In a step e), a payment operation is performed by a data processing program in the mobile communication device 6 and, upon successful completion of the payment operation, a "paid" signal is transmitted to a second receiver 20 by the mobile communication device 6 as a third signal S3. The "paid" signal is, for example, a code that contains an identification of the mobile communication device 6 and/or the positive completion of the payment operation.

In a step f), the third signal S3 is received by a second receiver 20 and forwarded to the signal converter 5.

In a step g), the third signal S3 is converted by the signal converter 5 into a fourth signal S4 and forwarded to a first transmitter 11. The fourth signal S4 includes, for example, the code of the third signal S3, but uses a different carrier frequency.

In a step h), the fourth signal S4 is transmitted by the first transmitter 11.

In a step i), the fourth signal S4 is received by the toll station receiver 30. The signal S4 received is then fed by the toll station receiver 32 to a data processing system that evaluates the fourth signal S4. If the fourth signal S4 includes a code for a successful payment operation ("paid" signal), passage through the toll station is enabled. This means that passage through the toll station is enabled, for example, by raising a gate or eliminating a different suitable barrier.

In another exemplary embodiment, in step e), it is checked whether the enable switch 7 was previously actuated, preferably whether within a time period t less than or equal to 300 s, particularly preferably less than or equal to 30 s, before performance of the step e), if the enable switch 7 was actuated. Only if the enable switch 7 was actuated is a payment operation performed and with a successfully completed payment operation, a "paid" signal is transmitted as a third signal S3.

LIST OF REFERENCE CHARACTERS 1 pane
5 signal converter
6 mobile communication device
7 enable switch
8 signal conductor
9 power supply
10 first receiver
11 first transmitter
20 second receiver
21 second transmitter
30 toll station receiver
31 toll station transmitter
100 vehicle antenna pane
300 toll payment system
A-A' section line
S1 first signal
S2 second signal
S3 third signal
S4 fourth signal
U lower edge
I outside surface of the pane 1
IV inside surface of the pane 1

The invention claimed is:

1. A vehicle antenna pane for a toll payment system, the vehicle antenna pane comprising:
   a pane;
   an enable switch integrated into the pane;
   a first receiver configured to receive a first short-range radio signal from a toll station transmitter;
   a signal converter configured to convert the first short-range radio signal into a second short-range radio signal and to convert a third short-range radio signal into a fourth short-range radio signal;

a second transmitter configured to transmit the second short-range radio signal to a mobile communication device;

a second receiver configured to receive the third short-range radio signal from the mobile communication device; and a first transmitter configured to transmit the fourth short-range radio signal to a toll station receiver, wherein the enable switch is electrically conductively connected to the signal converter.

2. The vehicle antenna pane according to claim 1, wherein the first receiver and the first transmitter are configured to receive and transmit signals in a short-range radio signal spectrum comprising one or more of a) the DSRC (Dedicated Short Range Communication) spectrum, and b) in the WLAN (Wireless Local Area Network) spectrum.

3. The vehicle antenna pane according to claim 2, wherein a) comprises a μwave DSRC spectrum according to one or more of a1) EN 12253 specified for 5.8 GHz, and a2) EN 302 571 specified for 5.9 GHz.

4. The vehicle antenna pane according to claim 2, wherein b) comprises a WLAN (Wireless Local Area Network) spectrum according to one or more of b1) IEEE-802.11 specified for 2.4 GHz, 5 GHz, or 60 GHz, b2) IEEE-802.11p.

5. The vehicle antenna pane according to claim 1, wherein the second receiver and the second transmitter are configured to receive and transmit signals in a spectrum comprising one or more of a) a NFC (Near Field Communication) spectrum, and b) in the WLAN (Wireless Local Area Network) spectrum.

6. The vehicle antenna pane according to claim 5, wherein a) comprises an NFC spectrum according to one or more of a1) ISO/IEC 13157, a2) ISO/IEC 16353, a3) ISO/IEC 22536, and a4) ISO/IEC 28361.

7. The vehicle antenna pane according to claim 5, wherein b) comprises a WLAN (Wireless Local Area Network) spectrum per one or more of: b1) IEEE-802.11 specified for 2.4 GHz, 5 GHz, or 60 GHz, b2) Bluetooth, and b3) IEEE 802.15.1.

8. The vehicle antenna pane according to claim 1, wherein the signal converter is electrically conductively connected to the first receiver, the first transmitter, the second receiver, and the second transmitter by at least one signal conductor.

9. The vehicle antenna pane according claim 1, wherein the pane is a composite pane for separating an inside defined by a vehicle interior from an outside defined by an external environment, the pane comprising:

an inner pane with an outside surface and an inside surface;

an outer pane with an outside surface and an inside surface; and at least one intermediate layer, which bonds the inside surface of the outer pane to the outside surface of the inner pane.

10. The vehicle antenna pane according to claim 9, wherein:

the first receiver is configured to receive the first short-range radio signal that arrives on the outside surface of the pane from the outside, the first transmitter is configured to transmit the fourth short-range radio signal from the pane to the outside, the second receiver is configured to receive the third short-range radio signal that arrives on the inside surface of the pane from the inside, and the second transmitter is configured to transmit the second short-range radio signal from the pane to the inside.

11. The vehicle antenna pane according to claim 9, wherein at least one of a) the first receiver, b) the first transmitter, c) the second receiver, d) the second transmitter, and e) the signal converter, is arranged between the inner pane and the outer pane.

12. The vehicle antenna pane according to claim 11, wherein a), b), c), d) and e) are arranged between the inner pane and the outer pane.

13. The vehicle antenna pane according to claim 9, wherein at least one of: a) the first receiver, b) the first transmitter, c) the second receiver, d) the second transmitter, and e) the signal converter, is arranged on the inside surface of the inner pane.

14. The vehicle antenna pane according to claim 1, wherein:

the pane is a windshield of a vehicle, and the second receiver and the second transmitter are arranged in a region of a lower edge of the pane.

15. The vehicle antenna pane according to claim 1, wherein at least one of the first receiver, the first transmitter, the second receiver, and the second transmitter is made of at least one of:

a printed and fired electrically conductive paste, an electrically conductive foil, and an electrically conductive structure formed on an electrically conductive layer and that is electrically isolated from a surrounding electrically conductive region of the electrically conductive layer via a coating-free separation region.

16. A toll payment system, comprising:

a vehicle antenna pane according to claim 1;

a toll station transmitter configured to transmit the first short-range radio signal to the first receiver of the vehicle antenna pane;

a toll station receiver configured to receive the fourth short-range radio signal transmitted by the first transmitter of the vehicle antenna pane; and a mobile communication device configured to receive the second short-range radio signal transmitted by the second transmitter of the vehicle antenna pane, and configured to transmit the third short-range radio signal to the second receiver of the vehicle antenna pane, wherein the third short-range radio signal is a "paid" signal that the mobile communication device transmits when a payment operation is performed.

17. The toll payment system according to claim 16, wherein upon actuation of the enable switch, the signal converter transmits an "enable" signal as the second short-range radio signal.

18. A method, comprising:

providing the vehicle antenna pane according to claim 1; and using the vehicle antenna pane in means of transportation.

19. A method for operating a toll payment system, the method comprising:

transmitting a first signal via a transmitter of a toll station;

receiving the first signal via a first receiver of a vehicle antenna pane, and based on the receiving, routing the first signal to a signal converter;

converting, via the signal converter, the first signal to a second signal, and routing the second signal to a second transmitter;

transmitting the second signal via the second transmitter, and based on the transmitting, receiving the second signal via a mobile communication device;

performing a payment operation by a data processing program executing in the mobile communication device, and upon successful completion of the payment operation, transmitting a "paid" signal as a third signal via the mobile communication device;

receiving the third signal via a second receiver, and based on the receiving, forwarding the third signal to the signal converter;

converting, via the signal converter, the third signal to a fourth signal, and forwarding the fourth signal to a first transmitter;

transmitting the fourth signal via the first transmitter; and receiving the fourth signal via a receiver of the toll station,
wherein the performing of the payment operation is based on actuation of an enable switch that is integrated into a pane of the vehicle antenna pane and is electrically conductively connected to the signal converter.

20. The method according to claim 19, further comprising:

checking, by the toll station, whether the fourth signal is a "paid" signal, and if the fourth signal is a "paid" signal, enabling passage through the toll station.

21. The method according to claim 19, wherein the performing of payment operation further comprises checking whether the enable switch is actuated within a time period less than or equal to 300 seconds.

* * * * *